(12) United States Patent
Wada

(10) Patent No.: US 11,867,527 B2
(45) Date of Patent: Jan. 9, 2024

(54) VEHICLE CONTROL SYSTEM AND OWN LANE IDENTIFYING METHOD

(71) Applicant: HONDA MOTOR CO., LTD., Tokyo (JP)

(72) Inventor: Koichiro Wada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 17/559,147

(22) Filed: Dec. 22, 2021

(65) Prior Publication Data

US 2022/0205810 A1 Jun. 30, 2022

(30) Foreign Application Priority Data

Dec. 28, 2020 (JP) .................. 2020-219157

(51) Int. Cl.
*G01C 21/00* (2006.01)
*G06V 20/56* (2022.01)
(Continued)

(52) U.S. Cl.
CPC ............ *G01C 21/3815* (2020.08); *G06T 7/74* (2017.01); *G06V 10/74* (2022.01); *G06V 20/588* (2022.01);
(Continued)

(58) Field of Classification Search
CPC .................. G01C 21/3815; G06T 7/74; G06T 2207/30242; G06T 2207/30256; G06V 10/74; G06V 20/588
See application file for complete search history.

(56) References Cited

U.S. PATENT DOCUMENTS

2005/0169501 A1\* 8/2005 Fujii .................... G06V 20/588
382/104
2008/0208460 A1\* 8/2008 Nakao ................ G01C 21/3658
701/532
(Continued)

FOREIGN PATENT DOCUMENTS

JP 2005215985 A 8/2005
JP 2010071810 A 4/2010
(Continued)

OTHER PUBLICATIONS

Notice of Reasons for Refusal for Japanese Patent Application No. 2020-219157 dated Jul. 26, 2022; 12 pp.

*Primary Examiner* — Hunter B Lonsberry
*Assistant Examiner* — Harrison Heflin
(74) *Attorney, Agent, or Firm* — Armstrong Teasdale LLP

(57) ABSTRACT

A vehicle control system includes an imaging device, a map generating unit, and an own lane identifying unit. The own lane identifying unit is configured to identify one lane as an own lane on a map in a case where the one lane is an only lane present in a specific area on the map, compare a type of a delimiting line of a captured own lane with types of delimiting lines of a plurality of lanes on the map in a case where the plurality of lanes are present in the specific area on the map, and identify one of the plurality of lanes on the map as the own lane on the map in a case where the type of the delimiting line of the captured own lane matches only a type of a delimiting line of the one of the plurality of lanes on the map.

6 Claims, 9 Drawing Sheets

(51) Int. Cl.
*G06V 10/74* (2022.01)
*G06T 7/73* (2017.01)

(52) U.S. Cl.
CPC .............. *G06T 2207/30242* (2013.01); *G06T 2207/30256* (2013.01)

(56) References Cited

U.S. PATENT DOCUMENTS

| | | |
|---|---|---|
| 2015/0325127 A1 | 11/2015 | Pandita et al. |
| 2017/0004711 A1 | 1/2017 | Pandita et al. |
| 2018/0348786 A1 | 12/2018 | Yasui et al. |
| 2019/0035110 A1* | 1/2019 | Shikimachi ............... G06T 7/74 |
| 2020/0240806 A1* | 7/2020 | Daikoku ................ G01C 21/38 |
| 2021/0064057 A1* | 3/2021 | Eldar ................ G01C 21/3602 |
| 2023/0122011 A1* | 4/2023 | Ishimaru .............. G06V 20/588 |
| | | 348/148 |

FOREIGN PATENT DOCUMENTS

| | | |
|---|---|---|
| JP | 2015212944 A | 11/2015 |
| JP | 2018203018 A | 12/2018 |

\* cited by examiner

Yes: LM own lane R is identified
No: LM own lane R is not identified

VEHICLE CONTROL SYSTEM AND OWN LANE IDENTIFYING METHOD

TECHNICAL FIELD

The present invention relates to a vehicle control system and an own lane identifying method.

BACKGROUND ART

Conventionally, various methods have been proposed for identifying an own lane on which a vehicle is traveling on a map. For example, the technique disclosed in Japanese Patent No. 6666304 identifies an own lane by comparing a pattern of a delimiting line acquired from map information with a pattern of a delimiting line recognized from an image captured by a camera.

In the above technique, an identifying method of the own lane is constant regardless of the number of lanes on a map. Accordingly, it is difficult to efficiently identify the own lane on the map according to the number of lanes on the map.

SUMMARY OF THE INVENTION

In view of the above background, an object of the present invention is to provide a vehicle control system and an own lane identifying method that can efficiently identify an own lane on a map according to the number of lanes on the map.

To achieve such an object, one aspect of the present invention provides a vehicle control system (1) comprising: an imaging device (18) configured to capture an image of a travel route on which a vehicle (V) is traveling; a map generating unit (53) configured to generate a map of a surrounding area of the vehicle; and an own lane identifying unit (54) configured to identify an own lane (R) on which the vehicle is traveling on the map, wherein the own lane identifying unit is configured to estimate a position (P) of the vehicle on the map, calculate the number of lanes (A) present in a specific area (Y) including the position of the vehicle on the map, identify one lane as the own lane on the map in a case where the one lane is an only lane present in the specific area on the map, compare a type of a delimiting line (B1) of a captured own lane (B) with types of delimiting lines (A1) of a plurality of lanes on the map in a case where the plurality of lanes are present in the specific area on the map, the captured own lane being an own lane recognized from the image captured by the imaging device, and identify one of the plurality of lanes on the map as the own lane on the map in a case where the type of the delimiting line of the captured own lane matches only a type of a delimiting line of the one of the plurality of lanes on the map.

According to this aspect, by changing an identifying method of the own lane on the map according to the number of lanes present in the specific area on the map, it is possible to efficiently identify the own lane on the map.

In the above aspect, preferably, in a case where the type of the delimiting line of the captured own lane matches the types of the delimiting lines of the plurality of lanes on the map and a road shoulder (D) is present on one lateral side of the captured own lane, the own lane identifying unit identifies an end lane as the own lane on the map, the end lane being arranged at an end on the one lateral side among the plurality of lanes on the map.

According to this aspect, it is possible to identify the own lane on the map based on the presence of the road shoulder, even if the type of the delimiting line of the captured own lane matches the types of the delimiting lines of the plurality of lanes on the map. Accordingly, it is possible to more efficiently identify the own lane on the map.

In the above aspect, preferably, in a case where the type of the delimiting line of the captured own lane matches the types of the delimiting lines of the plurality of lanes on the map, delimiting lines are present on both lateral sides of the captured own lane and both lateral sides of left and right adjacent lanes (F) arranged on both lateral sides of the captured own lane, and three lanes are present in the specific area on the map, the own lane identifying unit identifies a center lane among the three lanes as the own lane on the map.

According to this aspect, it is possible to identify the own lane on the map based on the presence of the delimiting lines on both lateral sides of the captured own lane and its adjacent lanes, even if the type of the delimiting line of the captured own lane matches the types of the delimiting lines of the plurality of lanes on the map. Accordingly, it is possible to more efficiently identify the own lane on the map.

In the above aspect, preferably, upon determining that the vehicle has performed a lane change on the map after identifying the own lane on the map, the own lane identifying unit changes the own lane on the map according to a direction of the lane change.

According to this aspect, it is possible to appropriately change the own lane on the map according to the lane change.

In the above aspect, preferably, in a case where a type of a delimiting line recognized from the image captured by the imaging device can be identified and a lane number of a newly identified own lane on the map does not match a lane number of a previously identified own lane on the map, the own lane identifying unit resets information on the own lane on the map.

According to this aspect, in a case where there is a possibility of incorrectly identifying the own lane on the map, it is possible to avoid keeping on incorrectly identifying the own lane on the map by resetting the information on the own lane on the map.

In the above aspect, preferably, upon ceasing to estimate the position of the vehicle on the map after identifying the own lane on the map, the own lane identifying unit resets information on the own lane on the map.

According to this aspect, in a case where there is a possibility of incorrectly identifying the own lane on the map, it is possible to avoid keeping on incorrectly identifying the own lane on the map by resetting the information on the own lane on the map.

In the above aspect, preferably, the vehicle control further comprises a movement amount calculating unit (32) configured to calculate a movement amount of the vehicle by using dead reckoning, wherein the own lane identifying unit maintains the information on the own lane on the map as long as determining that the vehicle does not deviate from the own lane on the map based on the movement amount of the vehicle calculated by the movement amount calculating unit, even when ceasing to estimate the position of the vehicle on the map after identifying the one lane, which is the only lane present in the specific area on the map, as the own lane on the map.

According to this aspect, it is possible to more efficiently identify the own lane on the map by exceptionally maintaining the information on the own lane on the map when determining that the vehicle does not deviate from the own lane on the map.

To achieve the above object, another aspect of the present invention provides an own lane identifying method for identifying an own lane (R) on which a vehicle (V) is traveling on a map, the own lane identifying method comprising: estimating a position (P) of the vehicle on the map; calculating the number of lanes (A) present in a specific area (Y) including the position of the vehicle on the map; identifying one lane as the own lane on the map in a case where the one lane is an only lane present in the specific area on the map; comparing a type of a delimiting line (B1) of a captured own lane (B) with types of delimiting lines (A1) of a plurality of lanes on the map in a case where the plurality of lanes are present in the specific area on the map, the captured own lane being an own lane recognized from a captured image; and identifying one of the plurality of lanes on the map as the own lane on the map in a case where the type of the delimiting line of the captured own lane matches only a type of a delimiting line of the one of the plurality of lanes on the map.

According to this aspect, by changing an identifying method of the own lane on the map according to the number of lanes present in the specific area on the map, it is possible to efficiently identify the own lane on the map.

Thus, according to the above aspects, it is possible to provide a vehicle control system and an own lane identifying method that can efficiently identify an own lane on a map according to the number of lanes on the map.

BRIEF DESCRIPTION OF THE DRAWING(S)

DETAILED DESCRIPTION OF THE INVENTION

Figure 1:
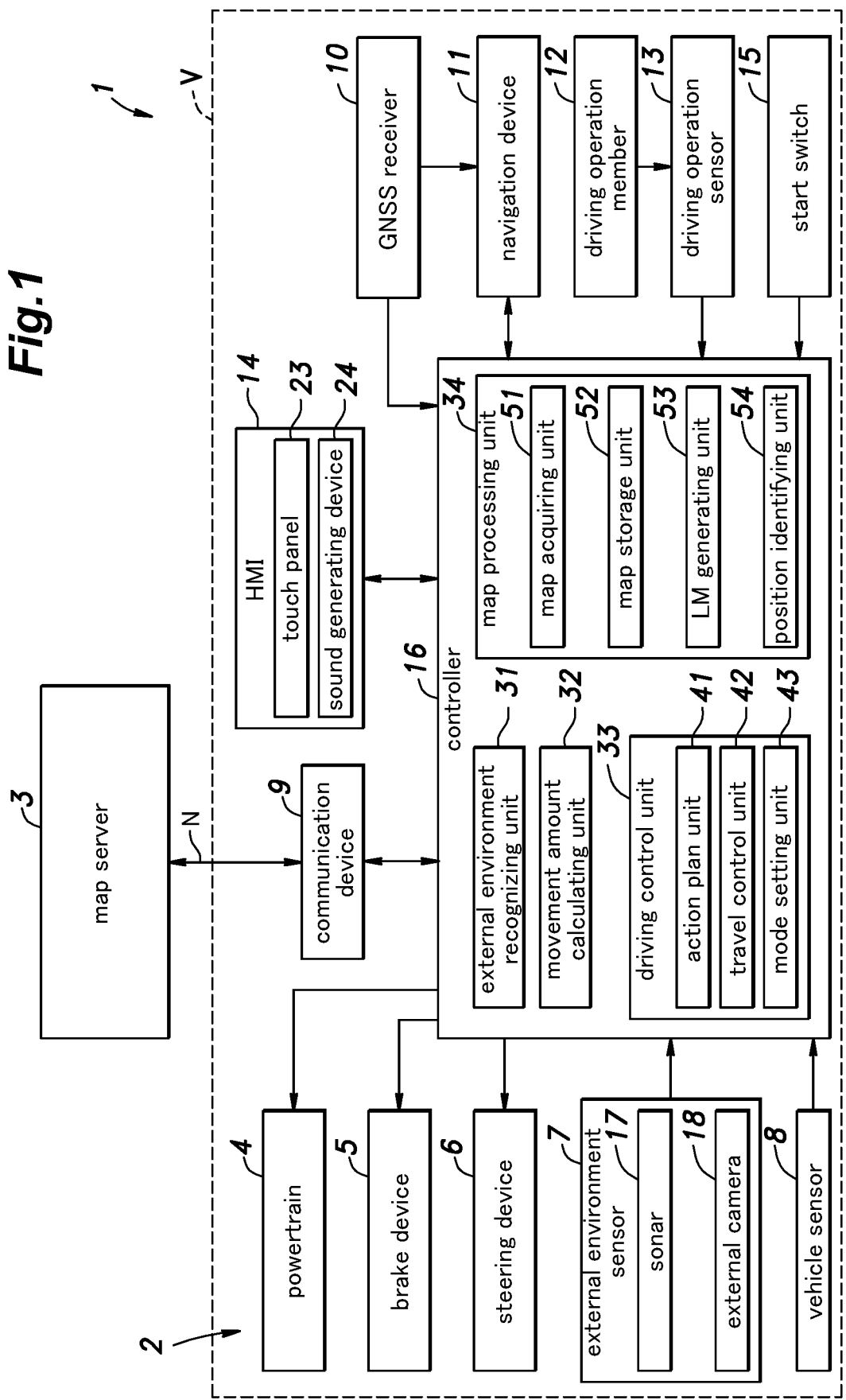
FIG. 1 is a block diagram of a vehicle control system according to an embodiment of the present invention.

In the following, a vehicle control system 1 according to an embodiment of the present invention will be described with reference to the drawings. As shown in FIG. 1, the vehicle control system 1 includes a vehicle system 2 mounted on a vehicle V, and a high-precision map server 3 (hereinafter, abbreviated as "the map server 3") connected to the vehicle system 2 via a network N. Hereinafter, the word "the vehicle V" indicates a vehicle (namely, the own vehicle) provided with the vehicle system 2.

<The Vehicle System 2>

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, a driving operation member 12, a driving operation sensor 13, an HMI 14, a start switch 15, and a controller 16. Each component of the vehicle system 2 is connected to each other via a communication means such as Controller Area Network (CAN) such that signals can be transmitted therebetween.

The powertrain 4 is a device configured to apply a driving force to the vehicle V. For example, the powertrain 4 includes at least one of an internal combustion engine (such as a gasoline engine and a diesel engine) and an electric motor. The brake device 5 is a device configured to apply a brake force to the vehicle V. For example, the brake device 5 includes a brake caliper configured to press a pad against a brake rotor and an electric cylinder configured to supply an oil pressure to the brake caliper. The brake device 5 may further include a parking brake device configured to restrict rotation of wheels via wire cables. The steering device 6 is a device configured to change the steering angles of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the controller 16.

The external environment sensor 7 is a sensor configured to detect an object outside the vehicle V or the like by capturing electromagnetic waves, sound waves, or the like from the surroundings of the vehicle V. The external environment sensor 7 includes a plurality of sonars 17 and a plurality of external cameras 18 (an example of an imaging device). The external environment sensor 7 may further include a millimeter wave radar and/or a laser lidar. The external environment sensor 7 is configured to output a detection result to the controller 16.

Each sonar 17 consists of a so-called ultrasonic sensor. The sonar 17 emits ultrasonic waves to the surroundings of the vehicle V and captures the reflected waves therefrom, thereby detecting a position (distance and direction) of the object. The plurality of sonars 17 are provided at a rear part and a front part of the vehicle V, respectively.

Each external camera 18 is a device configured to capture an image of the surroundings of the vehicle V. For example, the external camera 18 is a digital camera that uses a solid imaging element such as a CCD and a CMOS. The external camera 18 may consist of a stereo camera or a monocular camera. The plurality of external cameras 18 include a front camera configured to capture an image in front of the vehicle V, a rear camera configured to capture an image behind the vehicle V, and a pair of side cameras configured to capture images on both lateral sides of the vehicle V. When the vehicle V is traveling, each external camera 18 captures an image of a travel route on which the vehicle V is traveling at prescribed intervals (for example, at prescribed spatial intervals or prescribed temporal intervals).

The vehicle sensor 8 is a sensor configured to detect the state of the vehicle V. The vehicle sensor 8 includes a vehicle speed sensor configured to detect the speed of the vehicle V, an acceleration sensor configured to detect the acceleration of the vehicle V, a yaw rate sensor configured to detect the angular velocity around a vertical axis of the vehicle V, a direction sensor configured to detect the direction of the vehicle V, and the like. For example, the yaw rate sensor consists of a gyro sensor. The vehicle sensor 8 may further include an inclination sensor configured to detect the inclination of a vehicle body and a wheel speed sensor configured to detect the rotational speed of each wheel.

The communication device 9 is configured to mediate communication between the controller 16 and a device (for example, the map server 3) outside the vehicle V. The communication device 9 includes a router configured to connect the controller 16 to the Internet. The communication device 9 may have a wireless communication function of mediating wireless communication between the controller 16 of the vehicle V and the controller of the surrounding vehicle and between the controller 16 of the vehicle V and a roadside device on a road.

The GNSS receiver 10 is configured to receive a signal (hereinafter referred to as "the GNSS signal") relating to the position (latitude and longitude) of the vehicle V from each of satellites that constitute a Global Navigation Satellite System (GNSS). The GNSS receiver 10 is configured to output the received GNSS signal to the navigation device 11 and the controller 16.

The navigation device 11 consists of a computer provided with known hardware. The navigation device 11 is configured to identify the position (latitude and longitude) of the vehicle V based on the previous traveling history of the vehicle V and the GNSS signal output from the GNSS receiver 10. The navigation device 11 is configured to store data (hereinafter referred to as "the navigation map data") on roads of a region or a country on which the vehicle V is traveling. The navigation device 11 is configured to store the navigation map data in a RAM, an HDD, an SSD, or the like.

The navigation device 11 is configured to set, based on the GNSS signal and the navigation map data, a route from a current position of the vehicle V to a destination input by an occupant, and output the route to the controller 16. When the vehicle V starts traveling, the navigation device 11 provides the occupant with route guidance to the destination.

The driving operation member 12 is provided in a vehicle cabin and configured to accept an input operation the occupant performs to control the vehicle V. The driving operation member 12 includes a steering wheel, an accelerator pedal, and a brake pedal. The driving operation member 12 may further include a shift lever, a parking brake lever, a blinker lever, and the like.

The driving operation sensor 13 is a sensor configured to detect an operation amount of the driving operation member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 is configured to output the detected operation amount to the controller 16. The driving operation sensor 13 may further include a grip sensor configured to detect that the occupant grips the steering wheel. For example, the grip sensor consists of at least one capacitive sensor provided on an outer circumferential portion of the steering wheel.

The HMI 14 is configured to notify the occupant of various kinds of information by display and/or voice, and accept an input operation by the occupant. For example, the HMI 14 includes a touch panel 23 and a sound generating device 24. The touch panel 23 includes a liquid crystal display, an organic EL display, or the like, and is configured to accept the input operation by the occupant. The sound generating device 24 consists of a buzzer and/or a speaker. The HMI 14 is configured to display a driving mode switch button on the touch panel 23. The driving mode switch button is a button configured to accept a switching operation of a driving mode (for example, an autonomous driving mode and a manual driving mode) of the vehicle V by the occupant.

The HMI 14 also functions as an interface to mediate the input to/the output from the navigation device 11. Namely, when the HMI 14 accepts the input operation of the destination by the occupant, the navigation device 11 starts a route setting to the destination. Further, when the navigation device 11 provides the route guidance to the destination, the HMI 14 displays the current position of the vehicle V and the route to the destination.

The start switch 15 is a switch for starting the vehicle system 2. Namely, the occupant presses the start switch 15 while sitting on the driver's seat and pressing the brake pedal, and thus the vehicle system 2 is started.

The controller 16 consists of at least one electronic control unit (ECU) including a CPU, a ROM, a RAM, and the like. The CPU executes operation processing according to a program, and thus the controller 16 executes various types of vehicle control. The controller 16 may consist of one piece of hardware, or may consist of a unit including plural pieces of hardware. The functions of the controller 16 may be at least partially executed by hardware such as an LSI, an ASIC, and an FPGA, or may be executed by a combination of software and hardware.

The controller 16 includes an external environment recognizing unit 31 (an example of a delimiting line estimating unit), a movement amount calculating unit 32, a driving control unit 33, and a map processing unit 34. These components may be composed of separate electronic control units or integrated electronic control units.

The external environment recognizing unit 31 is configured to recognize an object that is present in the surroundings of the vehicle V based on the detection result of the external environment sensor 7, and thus acquire information on the position and size of the object. The object recognized by the external environment recognizing unit 31 includes delimiting lines, lanes, road ends, road shoulders, and obstacles, which are present on the travel route of the vehicle V. Each delimiting line is a line shown along a vehicle travel direction. Each lane is an area delimited by one or more delimiting lines. Each road end is an end of the travel route of the vehicle V. Each road shoulder is an area between the delimiting line arranged at an end in the vehicle width direction (lateral direction) and the road end. Each obstacle may be a barrier (guardrail), a utility pole, a surrounding vehicle, a pedestrian, or the like.

The external environment recognizing unit 31 is configured to recognize, based on the image (hereinafter referred to as "the camera image") captured by each external camera 18, the position of the delimiting line (hereinafter referred to as "the camera delimiting line") in the camera image. For example, the external environment recognizing unit 31 is configured to extract points (hereinafter referred to as "the candidate points") whose density value changes by a threshold or more in the camera image, and recognize a straight line passing through the candidate points as the camera delimiting line. The external environment recognizing unit 31 is configured to identify the type of the camera delimiting line based on the camera image. The type of the camera delimiting line includes a single solid line, a single broken line, a deceleration promotion line, and a double solid line. The deceleration promotion line consists of, for example, a broken line with shorter intervals and a greater width than the single broken line.

The movement amount calculating unit 32 is configured to calculate, based on the signal from the vehicle sensor 8, a movement amount of the vehicle V (a movement distance and a movement direction of the vehicle V) by using dead reckoning such as odometry and inertial navigation. For example, the movement amount calculating unit 32 is configured to calculate the movement amount of the vehicle V based on the rotational speed of each wheel detected by the wheel speed sensor, the acceleration of the vehicle V detected by the acceleration sensor, and the angular velocity of the vehicle V detected by the gyro sensor. Hereinafter, the movement amount of the vehicle V the movement amount calculating unit 32 calculates by using dead reckoning will be referred to as "the DR movement amount of the vehicle V".

The driving control unit 33 includes an action plan unit 41, a travel control unit 42, and a mode setting unit 43.

The action plan unit 41 is configured to create an action plan for causing the vehicle V to travel along the route set by the navigation device 11. The action plan unit 41 is configured to output a travel control signal corresponding to the created action plan to the travel control unit 42.

The travel control unit 42 is configured to control the powertrain 4, the brake device 5, and the steering device 6 based on the travel control signal from the action plan unit 41. Namely, the travel control unit 42 is configured to cause the vehicle V to travel according to the action plan created by the action plan unit 41.

The mode setting unit 43 is configured to switch the driving mode of the vehicle V between the manual driving mode and the autonomous driving mode. In the manual driving mode, the travel control unit 42 controls the powertrain 4, the brake device 5, and the steering device 6 according to the input operation on the driving operation member 12 by the occupant, thereby causing the vehicle V to travel. On the other hand, in the autonomous driving mode, the travel control unit 42 controls the powertrain 4, the brake device 5, and the steering device 6 regardless of the input operation on the driving operation member 12 by the occupant, thereby causing the vehicle V to travel autonomously.

The map processing unit 34 includes a map acquiring unit 51, a map storage unit 52, a local map generating unit 53 (an example of a map generating unit: hereinafter referred to as "the LM generating unit 53"), and a position identifying unit 54 (an example of an own lane identifying unit).

The map acquiring unit 51 is configured to access the map server 3 and acquire dynamic map data (which will be described in detail later) from the map server 3. For example, the map acquiring unit 51 is configured to acquire, from the map server 3, the dynamic map data of an area corresponding to the route set by the navigation device 11.

The map storage unit 52 consists of a storage unit such as an HDD and an SSD. The map storage unit 52 is configured to store various kinds of information for causing the vehicle V to travel autonomously in the autonomous driving mode. The map storage unit 52 is configured to store the dynamic map data acquired by the map acquiring unit 51 from the map server 3.

The LM generating unit 53 is configured to generate a detailed map (hereinafter referred to as "the local map") of the surrounding area of the vehicle V based on the dynamic map data stored in the map storage unit 52. The LM generating unit 53 is configured to generate the local map by extracting the data relating to the surrounding area of the vehicle V from the dynamic map data. Accordingly, the local map may include any information included in the dynamic map data. For example, the local map includes information on the lanes (for example, the number of lanes and the lane number of each lane) on the travel route and information on each delimiting line (for example, the type of the delimiting line) on the travel route. Further, the local map may include information on the object (for example, the obstacle) recognized by the external environment recognizing unit 31 based on the camera image and information on the past DR movement amount of the vehicle V (namely, the movement trajectory of the vehicle V). When the vehicle V is traveling autonomously in the autonomous driving mode, the LM generating unit 53 may update the local map at any time according to the travel position of the vehicle V.

The position identifying unit 54 is configured to execute various kinds of localization processes on the local map. For example, the position identifying unit 54 is configured to estimate the position of the vehicle V on the local map based on the GNSS signal output from the GNSS receiver 10, the DR movement amount of the vehicle V, the camera image, and the like. Further, the position identifying unit 54 is configured to identify the position of an own lane (a lane in which the vehicle V is traveling) on the local map based on the GNSS signal output from the GNSS receiver 10, the camera image, and the like. When the vehicle V is traveling autonomously in the autonomous driving mode, the position identifying unit 54 may update the position of the vehicle V and the position of the own lane on the local map at any time according to the travel position of the vehicle V.

<The Map Server 3>

Next, the map server 3 will be described. As shown in FIG. 1, the map server 3 is connected to the controller 16 via the network N (in the present embodiment, the Internet) and the communication device 9. The map server 3 is a computer including a CPU, a ROM, a RAM, and a storage unit such as an HDD and an SSD. The dynamic map data is stored in the storage unit of the map server 3.

The dynamic map data includes static information, semi-static information, semi-dynamic information, and dynamic information. The static information includes 3D map data that is more precise than the navigation map data. The semi-static information includes traffic regulation information, road construction information, and wide area weather information. The semi-dynamic information includes accident information, traffic congestion information, and small area weather information. The dynamic information includes signal information, surrounding vehicle information, and pedestrian information.

The static information of the dynamic map data includes information on lanes (for example, the number of lanes and the lane number of each lane) on the travel route and information on each delimiting line on the travel route (for example, the type of the delimiting line). For example, the delimiting line in the static information is represented by nodes arranged at prescribed intervals and links connecting the nodes.

<The Own Lane Identifying Control>

Figure 2:
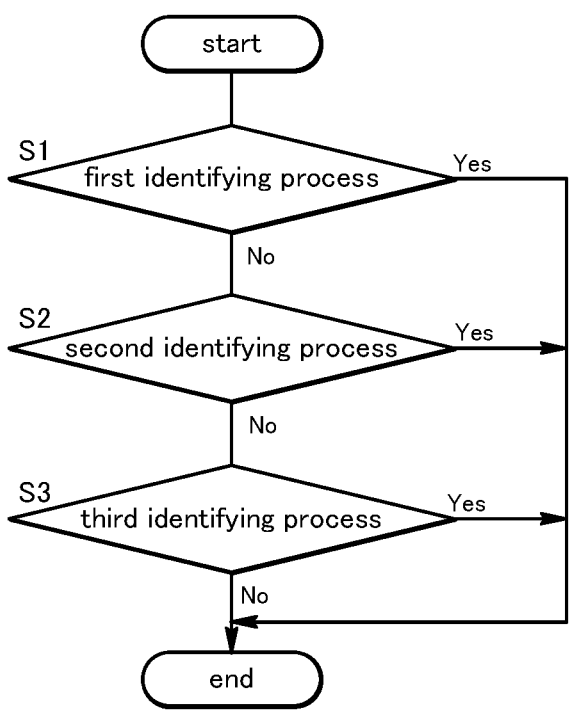
FIG. 2 is a flowchart showing own lane identifying control according to the embodiment of the present invention.

Next, with reference to FIG. 2, an outline of own lane identifying control (an example of an own lane identifying method) for identifying the own lane R (hereinafter referred to as "the LM own lane R") on which the vehicle V is traveling on the local map will be described. "Yes" in FIG. 2 indicates that the LM own lane R is identified, while "No" in FIG. 2 indicates that the LM own lane R is not identified.

When the own lane identifying control is started, the position identifying unit 54 executes a first identifying process (step S1). In the first identifying process, the position identifying unit 54 estimates the position of the vehicle V on the local map, and calculates the number of lanes A (hereinafter referred to as "the LM lanes A") present in a specific area Y including the position of the vehicle V on the local map. In a case where only one LM lane A is present in the specific area Y on the local map, the position identifying unit 54 identifies the one LM lane A as the LM own lane R, and terminates the own lane identifying control.

On the other hand, in a case where a plurality of LM lanes A are present in the specific area Y on the local map, the position identifying unit 54 executes a second identifying process without identifying the LM own lane R in the first identifying process (step S2). In the second identifying process, the position identifying unit 54 compares the types of the delimiting lines B1 of the own lane B (an example of a captured own lane: hereinafter referred to as "the camera own lane B") recognized from the camera image with the types of the delimiting lines A1 of the LM lanes A. Consequently, in a case where the types of the delimiting lines B1 of the camera own lane B match the types of the delimiting lines A1 of only one of the LM lanes A, the position identifying unit 54 identifies the one of the LM lanes A as the LM own lane R, and terminates the own lane identifying control.

On the other hand, in a case where the types of the delimiting lines B1 of the camera own lane B match the types of the delimiting lines A1 of a plurality of LM lanes A, the position identifying unit 54 executes a third identifying process without identifying the LM own lane R in the second identifying process (step S3). In the third identifying process, in a case where one of the LM lanes A satisfies a prescribed condition, the position identifying unit 54 identifies the one of the LM lanes A as the LM own lane R, and terminates the own lane identifying control. In the other cases, the position identifying unit 54 terminates the own lane identifying control without identifying the LM own lane R in the third identifying process.

<The First Identifying Process>

Figure 3:
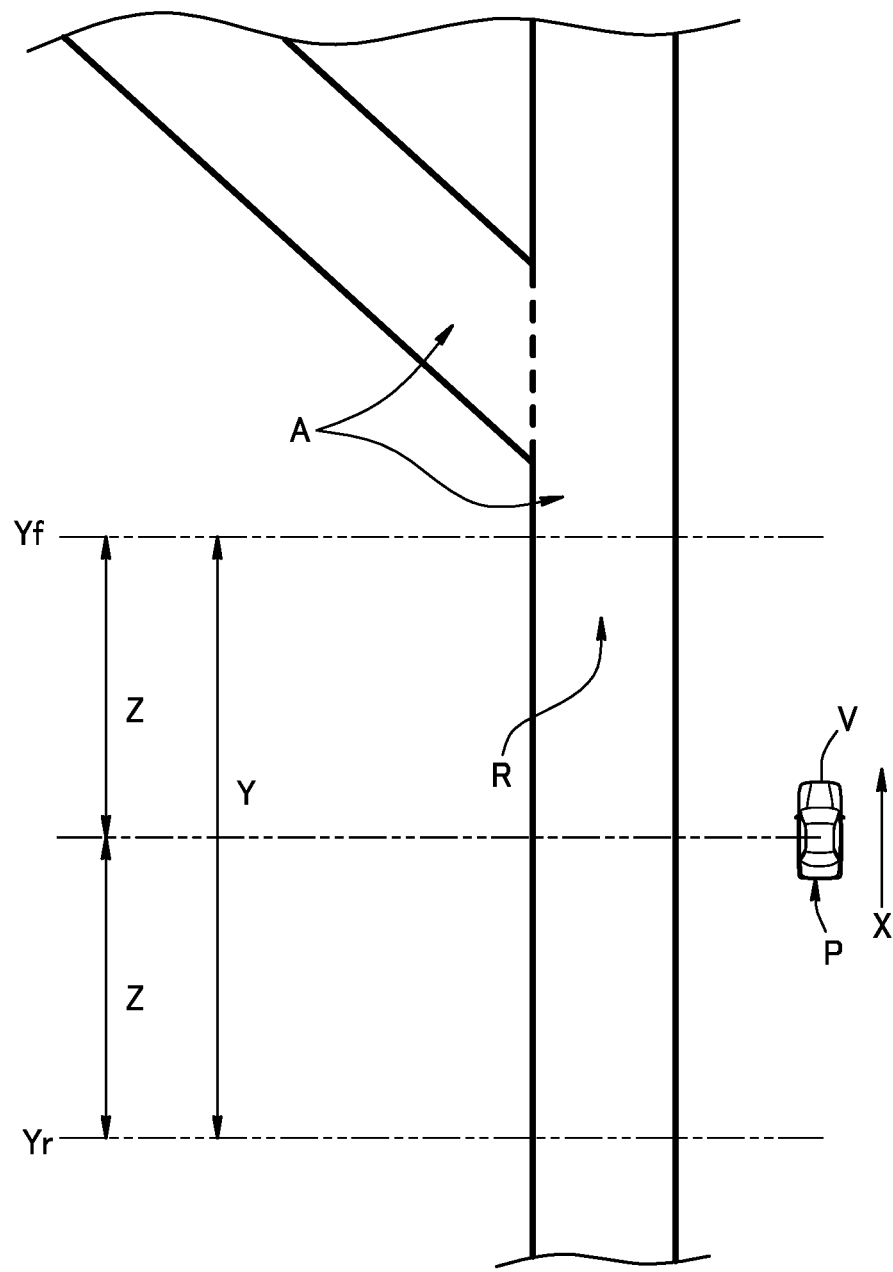
FIG. 3 is a plan view showing an example of a local map.
Figure 3:
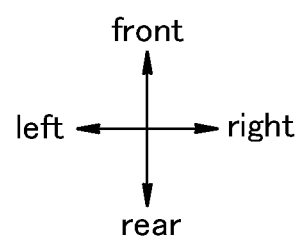
Figure 4:
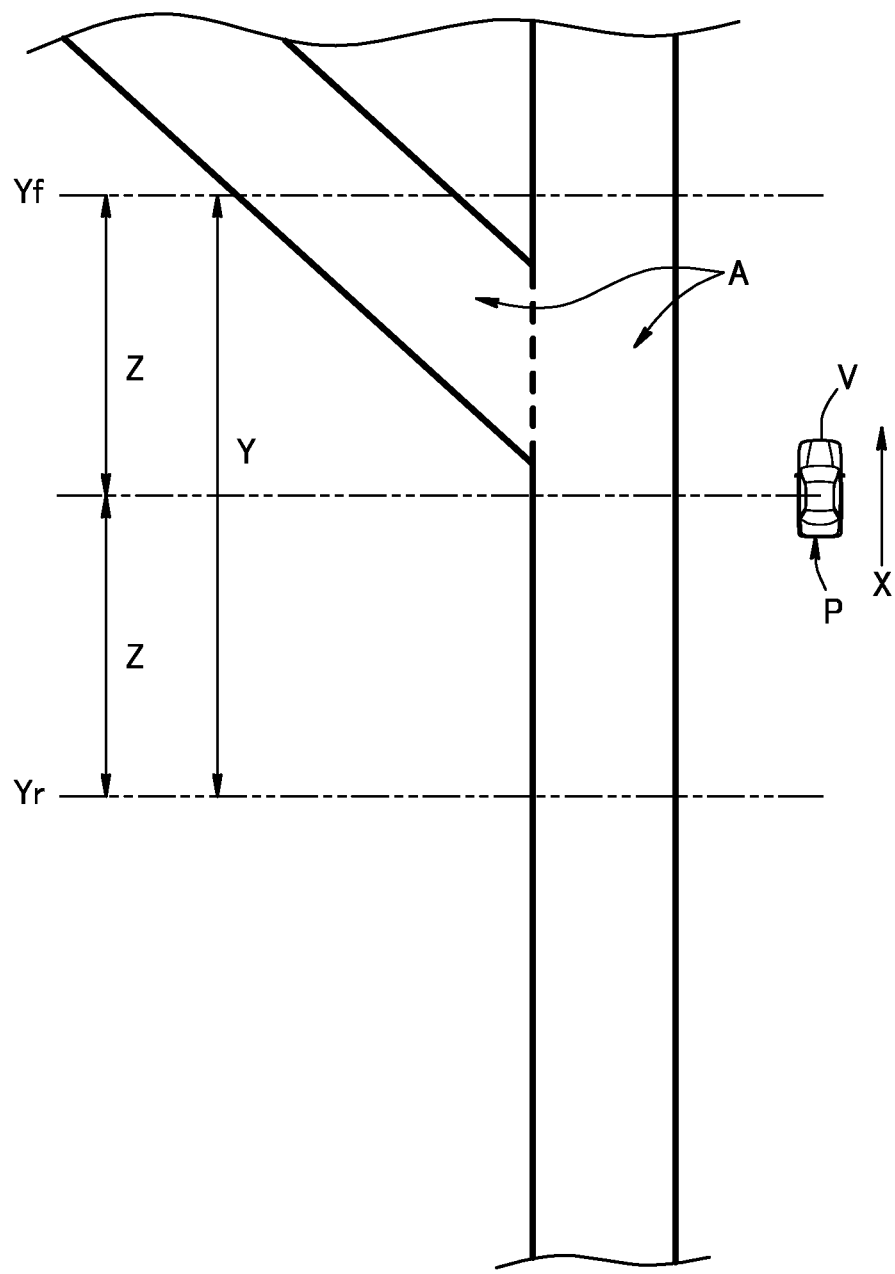
FIG. 4 is a plan view showing an example of the local map.

Next, the first identifying process (step S1) of the own lane identifying control will be described with reference to FIGS. 3 and 4. FIG. 3 shows an example of the local map when the vehicle V is traveling at some position, and FIG. 4 shows an example of the local map when the vehicle V is traveling at a position different from that of FIG. 3.

When the first identifying process is started, the position identifying unit 54 estimates the position of the vehicle V on the local map based on the GNSS signal output from the GNSS receiver 10. Hereinafter, the position of the vehicle V on the local map estimated based on the GNSS signal will be referred to as "the GNSS own vehicle position P".

Next, the position identifying unit 54 calculates the number of LM lanes A present in the specific area Y including the GNSS own vehicle position P on the local map. For example, the specific area Y is an area extending from a rear boundary position Yr to a front boundary position Yf. The rear boundary position Yr is a position shifted rearward in the vehicle travel direction X from the GNSS own vehicle position P by a prescribed distance Z. The front boundary position Yf is a position shifted forward in the vehicle travel direction X from the GNSS own vehicle position P by the prescribed distance Z. The specific area Y may satisfy not only the above condition regarding the vehicle travel direction X (front-and-rear direction) but also a condition regarding the vehicle width direction (lateral direction).

As shown in FIG. 3, in a case where only one LM lane A is present in the specific area Y, the position identifying unit 54 identifies the one LM lane A as the LM own lane R. On the other hand, as shown in FIG. 4, in a case where a plurality of LM lanes A are present in the specific area Y, the position identifying unit 54 terminates the first identifying process without identifying any of the LM lanes A as the LM own lane R.

<The Second Identifying Process>

Figure 5A:
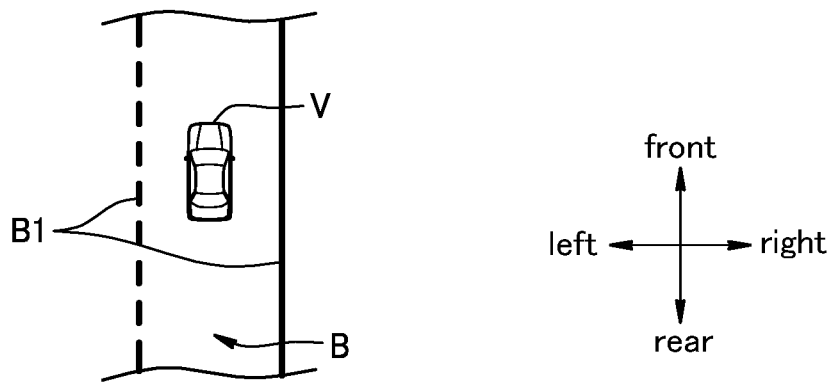
FIG. 5A is a plan view showing an example of information acquired from a camera image.
Figure 5B:
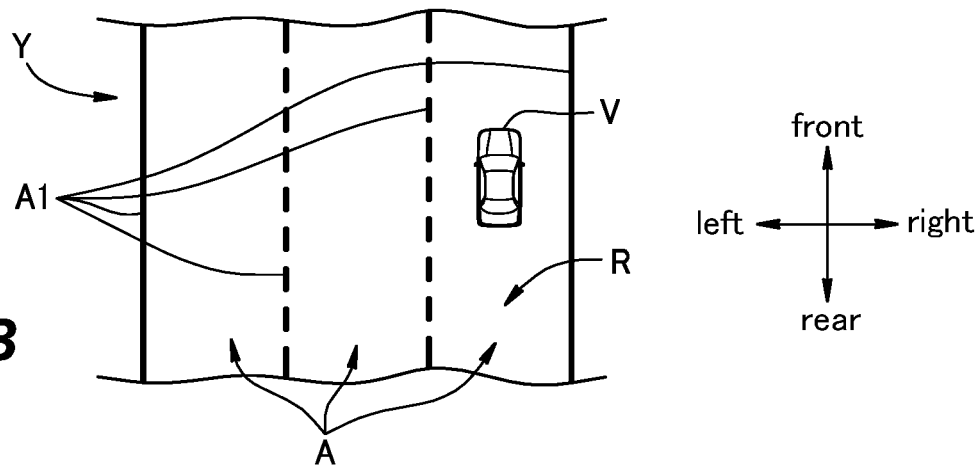
FIG. 5B is a plan view showing an example of the local map.
Figure 5C:
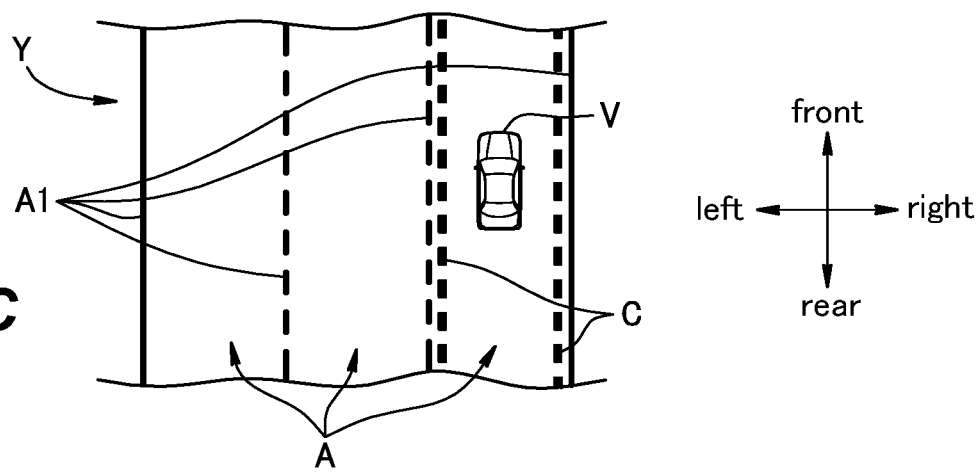
FIG. 5C is a plan view showing an example of the local map.

Next, the second identifying process (step S2) of the own lane identifying control will be described with reference to FIGS. 5A to 5C. FIG. 5A shows an example of information acquired from the camera image when the vehicle V is traveling at some position. FIGS. 5B and 5C show examples of the local map when the vehicle V is traveling at the same position that FIG. 5A shows.

When the second identifying process is started, the position identifying unit 54 determines the types of the delimiting lines B1 of the camera own lane B, and also determines the types of the delimiting lines A1 of the LM lanes A present in the specific area Y. Next, the position identifying unit 54 compares the types of the delimiting lines B1 of the camera own lane B with the types of the delimiting lines A1 of the LM lanes A. Consequently, in a case where the types of the delimiting lines B1 of the camera own lane B match the types of the delimiting lines A1 of only one LM lane A, the position identifying unit 54 identifies the one LM lane A as the LM own lane R. On the other hand, in a case where the types of the delimiting lines B1 of the camera own lane B match the types of the delimiting lines A1 of a plurality of LM lanes A, or in a case where the types of the delimiting lines B1 of the camera own lane B do not match the types of the delimiting lines A1 of any of the LM lanes A, the position identifying unit 54 terminates the second identifying process without identifying any of the LM lanes A as the LM own lane R.

For example, in FIG. 5A, the type of the delimiting line B1 on the right side of the camera own lane B is a solid line, and the type of the delimiting line B1 on the left side of the camera own lane B is a broken line. On the other hand, in FIG. 5B, the type of the delimiting line A1 on the right side of the left LM lane A is a broken line, and the type of the delimiting line A1 on the left side of the left LM lane A is a solid line. Further, the type of the delimiting lines A1 on left and right sides of the center LM lane A is a broken line. Further, the type of the delimiting line A1 on the right side of the right LM lane A is a solid line, and the type of the delimiting line A1 on the left side of the right LM lane A is a broken line. Thus, in FIGS. 5A and 5B, the types of the delimiting lines B1 on both lateral sides (left and right sides) of the camera own lane B match only the types of the delimiting lines A1 on both lateral sides (left and right sides) of the right LM lane A. Accordingly, the position identifying unit 54 identifies the right LM lane A as the LM own lane R.

As shown in FIG. 5C, the LM lane A may be provided with the deceleration promotion lines C in addition to or instead of the delimiting lines A1. In such a case, even if the types of the delimiting lines B1 of the camera own lane B match the types of the delimiting lines A1 of only one LM lane A, the position identifying unit 54 terminates the second identifying process without identifying the one LM lane A as the LM own lane R.

<The Third Identifying Process>

Figure 6A:
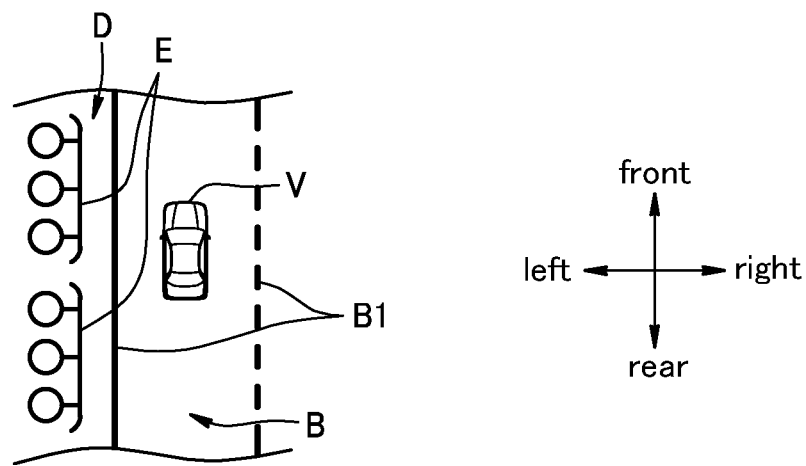
FIG. 6A is a plan view showing an example of the information acquired from the camera image.
Figure 6B:
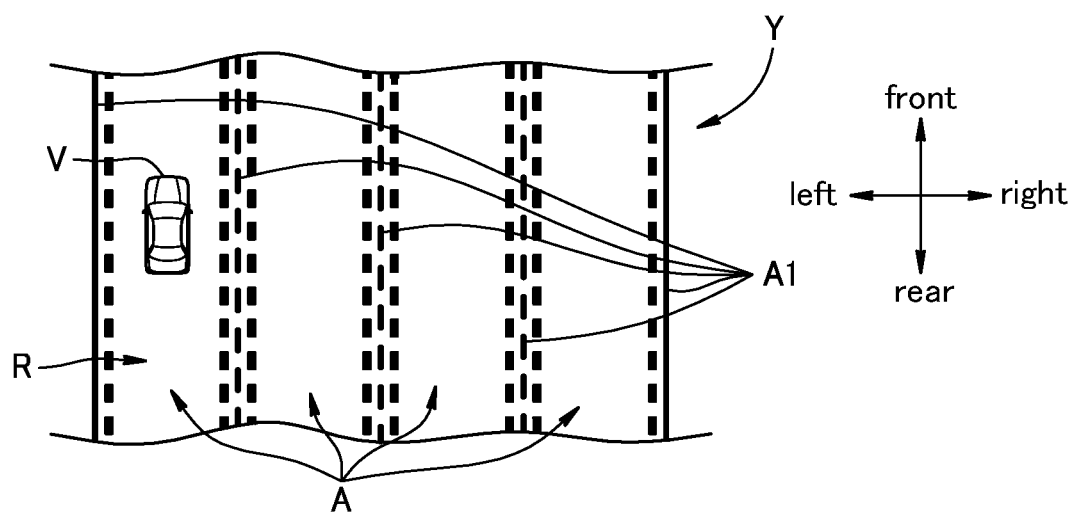
FIG. 6B is a plan view showing an example of the local map.
Figure 7A:
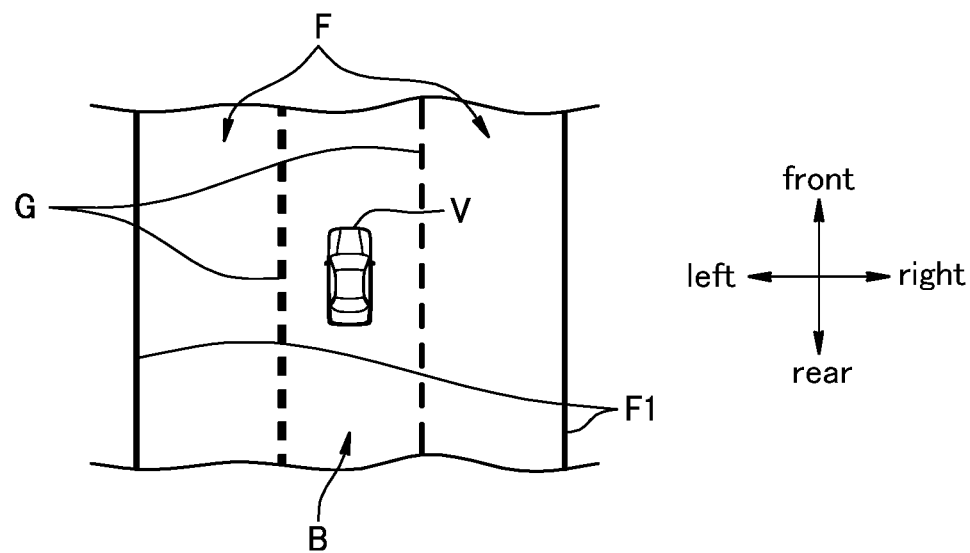
FIG. 7A is a plan view showing an example of the information acquired from the camera image.
Figure 7B:
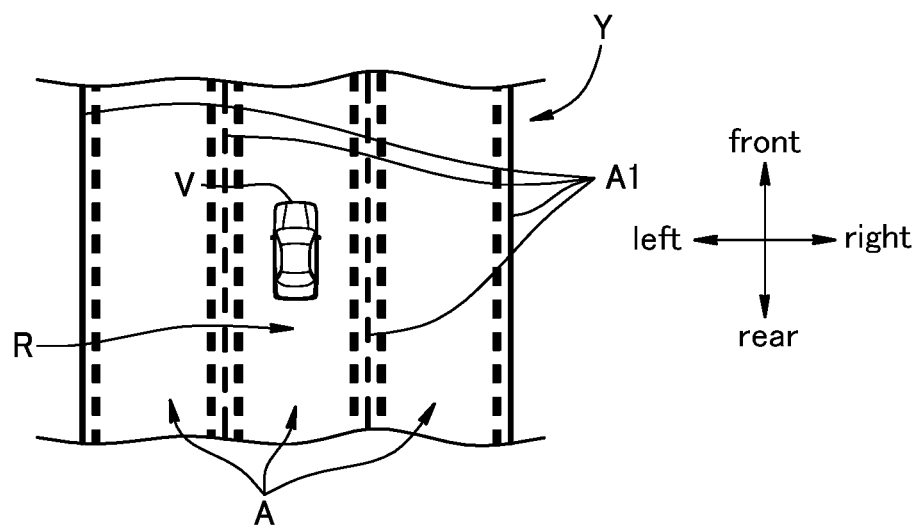
FIG. 7B is a plan view showing an example of the local map.

Next, the third identifying process (step S3) of the own lane identifying control will be described with reference to FIGS. 6A, 6B, 7A, and 7B. FIG. 6A shows an example of the information acquired from the camera image when the vehicle V is traveling at some position. FIG. 6B shows an example of the local map when the vehicle V is traveling at the same position that FIG. 6A shows. FIG. 7A shows an example of the information acquired from the camera image when the vehicle V is traveling at some position. FIG. 7B shows an example of the local map when the vehicle V is traveling at the same position that FIG. 7A shows.

When the third identifying process is started, the position identifying unit 54 determines whether the road shoulder D is present on one lateral side (a left side or a right side) of the camera own lane B. For example, in a case where at least one object E (for example, a road end, a structure, or a curb) indicating the road shoulder D is recognized in a space on the one lateral side of the camera own lane B, the position identifying unit 54 determines that the road shoulder D is present on the one lateral side of the camera own lane B. Upon determining that the road shoulder D is present on the one lateral side of the camera own lane B, the position identifying unit 54 identifies an end LM lane A (an LM lane A arranged at an end on the one lateral side among the LM lanes A) as the LM own lane R.

For example, in FIG. 6A, objects E (structures such as guardrails) indicating the road shoulder D are recognized in a space on the left side of the camera own lane B, and thus the position identifying unit 54 determines that the road shoulder D is present on the left side of the camera own lane B. Accordingly, in FIG. 6B, the position identifying unit 54 identifies an end LM lane A (an LM lane A arranged at the left end among the LM lanes A) as the LM own lane R.

On the other hand, upon determining that the road shoulder D is not present on both lateral sides of the camera own lane B, the position identifying unit 54 determines whether both of the following conditions 1 and 2 are satisfied.
<Condition 1>

The delimiting lines are present on both lateral sides of the camera own lane B and both lateral sides of left and right adjacent lanes F (hereinafter referred to as "the camera adjacent lanes F") arranged on both lateral sides of the camera own lane B.
<Condition 2>

Three LM lanes A are present in the specific area Y on the local map.

In a case where both of the conditions 1 and 2 are satisfied, the position identifying unit 54 identifies the center LM lane A among the three LM lanes A as the LM own lane R. On the other hand, in a case where at least one of the conditions 1 and 2 is not satisfied, the position identifying unit 54 terminates the third identifying process without identifying any of the LM lanes A as the LM own lane R.

For example, in FIG. 7A, delimiting lines G (common delimiting lines of the camera own lane B and the camera adjacent lanes F) and delimiting lines F1 (delimiting lines of the camera adjacent lanes F) are present on both lateral sides of the camera own lane B and both lateral sides of the left and right camera adjacent lanes F. Further, in FIG. 7B, three LM lanes A are present in the specific area Y on the local map. Namely, in FIGS. 7A and 7B, both of the conditions 1 and 2 are satisfied. Accordingly, in FIG. 7B, the position identifying unit 54 identifies the center LM lane A among the three LM lanes A as the LM own lane R.
<The Lane Change Determining Control>

Figure 8:
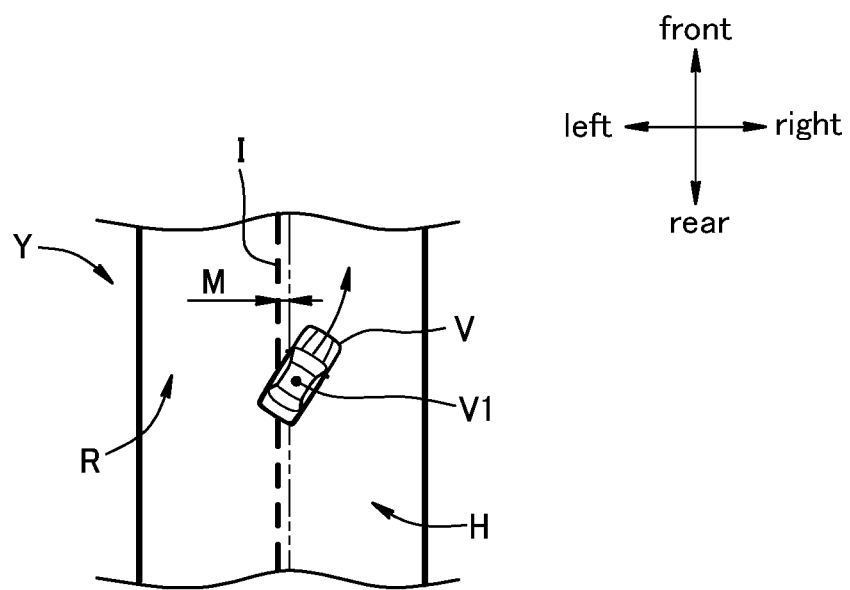
FIG. 8 is a plan view showing an example of the local map.
Figure 9:
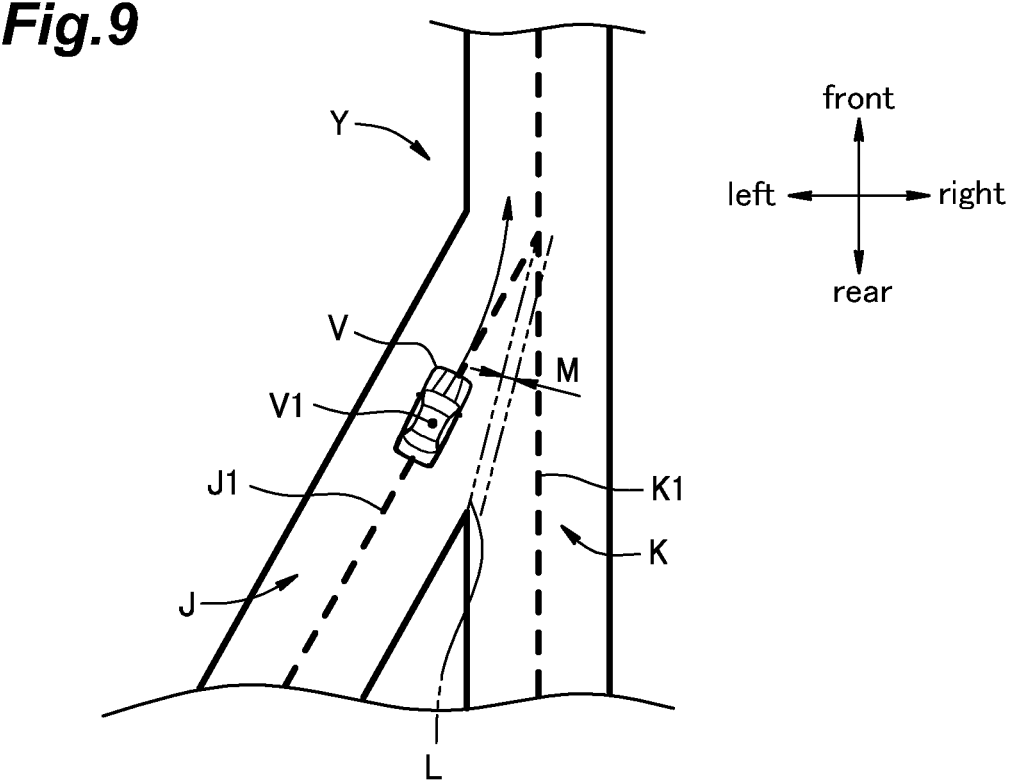
FIG. 9 is a plan view showing an example of the local map.

Next, with reference to FIGS. 8 and 9, lane change determining control for determining whether the vehicle V has performed a lane change on the local map will be described. FIG. 8 shows an example of the local map when the vehicle V is traveling at some position. FIG. 9 shows an example of the local map when the vehicle V is traveling at a position different from that of FIG. 8.

The position identifying unit 54 executes the lane change determining control after identifying the LM own lane R in the second identifying process or the third identifying process of the own lane identifying control. In the lane change determining control, the position identifying unit 54 determines whether the vehicle V has performed the lane change on the local map. For example, as shown in FIG. 8, in a case where the center V1 of the vehicle V on the local map has crossed a delimiting line I (hereinafter referred to as "the LM own delimiting line I") of the LM own lane R and has shifted from the LM own delimiting line I by a prescribed length M or more, the position identifying unit 54 determines that the vehicle V has performed the lane change across the LM own delimiting line I.

Upon determining that the vehicle V has performed the lane change across the LM own delimiting line I, the position identifying unit 54 changes the LM own lane R by switching the lane number of the LM own lane R according to the direction of the lane change. For example, in FIG. 8, the vehicle V has performed the lane change from the LM own lane R (lane number 1) to the adjacent lane H (lane number 2: hereinafter referred to as "the LM adjacent lane H") across the LM own delimiting line I. Accordingly, the position identifying unit 54 switches the lane number of the LM own lane R from 1 to 2, thereby changing the LM own lane R (lane number 1) before the lane change to the LM adjacent lane H and also changing the LM adjacent lane H (lane number 2) before the lane change to the LM own lane R.

By the way, as shown in FIG. 9, at a place where a merging lane J (hereinafter referred to as "the LM merging lane J") on the local map merges with a main lane K (hereinafter referred to as "the LM main lane K") on the local map, the delimiting line may not be present between the LM merging lane J and the LM main lane K. In such a case, the position identifying unit 54 sets a virtual delimiting line L between the LM merging lane J and the LM main lane K. For example, the virtual delimiting line L is set such that the distance from the center line J1 of the LM merging lane J to the virtual delimiting line L is equal to the distance from the center line K1 of the LM main lane K to the virtual delimiting line L. In a case where the center V1 of the vehicle V on the local map has crossed the virtual delimiting line L and has shifted from the virtual delimiting line L by the prescribed length M or more, the position identifying unit 54 determines that the vehicle V has performed the lane change from the LM merging lane J (namely, the LM own lane R) to the LM main lane K (namely, the LM adjacent lane H) across the virtual delimiting line L. Incidentally, the position identifying unit 54 may set a virtual delimiting line L similar to the above virtual delimiting line L for an area where the LM main lane K branches into a plurality of branch lanes on the local map.
<The Own Lane Reset Control>

Next, own lane reset control for resetting the lane number of the LM own lane R (an example of information on the LM own lane R) identified in the own lane identifying control will be described.

The position identifying unit 54 executes the own lane reset control after identifying the LM own lane R in the own lane identifying control. In the own lane reset control, the position identifying unit 54 resets the lane number of the LM own lane R in a case where at least one of the following conditions 1 to 4 is satisfied.
<Condition 1>

The LM own lane R is incorrectly identified.
<Condition 2>

The local map is not output from the LM generating unit 53 to the position identifying unit 54.

<Condition 3>

Information on the delimiting lines A1 of the LM lanes A in front of the vehicle V is not present.

<Condition 4>

The position of the vehicle V (hereinafter referred to as "the LM own vehicle position") on the local map cannot be estimated.

Regarding the condition 1, the position identifying unit 54 determines that the LM own lane R is incorrectly identified in a case where both of the following conditions 1-1 and 1-2 are satisfied.

<Condition 1-1>

The type of the camera delimiting line can be identified.

<Condition 1-2>

The lane number of a newly identified LM own lane R identified in the current own lane identifying control does not match a lane number (including a lane number switched in the lane change determining control) of a previously identified LM own lane R identified in the previous own lane identifying control.

Regarding the condition 4, the position identifying unit 54 may cease to estimate the LM own vehicle position after identifying the LM own lane R in the first identifying process. Even in such a case, the position identifying unit 54 maintains the lane number of the LM own lane R without resetting the same as long as determining that the position of the vehicle V, which is calculated from the last estimated LM own vehicle position based on the DR movement amount of the vehicle V, does not deviate from the LM own lane R.

Effect

According to the present embodiment, the position identifying unit 54 identifies one LM lane A as the LM own lane R in a case where the one LM lane A is an only lane present in the specific area Y on the local map. Also, the position identifying unit 54 compares the types of the delimiting lines B1 of the camera own lane B with the types of the delimiting lines A1 of a plurality of LM lanes A in a case where the plurality of LM lanes A are present in the specific area Y. Then, the position identifying unit 54 identifies one of the plurality of LM lanes A as the LM own lane R in a case where the types of the delimiting lines B1 of the camera own lane B matches only the types of the delimiting lines A1 of the one of the plurality of LM lanes A. In this way, by changing an identifying method of the LM own lane R according to the number of LM lanes A present in the specific area Y, it is possible to efficiently identify the LM own lane R.

Further, in a case where the types of the delimiting lines B1 of the camera own lane B match the types of the delimiting lines A1 of a plurality of LM lanes A and the road shoulder D is present on one lateral side of the camera own lane B, the position identifying unit 54 identifies an end LM lane A (an LM lane A arranged at an end on the one lateral side among the LM lanes A) as the LM own lane R. Accordingly, it is possible to identify the LM own lane R based on the presence of the road shoulder D, even if the types of the delimiting lines B1 of the camera own lane B match the types of the delimiting lines A1 of the plurality of LM lanes A. Accordingly, it is possible to more efficiently identify the LM own lane R.

Further, in a case where the types of the delimiting lines B1 of the camera own lane B match the types of the delimiting lines A1 of a plurality of LM lanes A, delimiting lines are present on both lateral sides of the camera own lane B and both lateral sides of the camera adjacent lanes F, and three LM lanes A are present in the specific area Y on the local map, the position identifying unit 54 identifies the center LM lane A among the three LM lanes A as the LM own lane R. Accordingly, it is possible to identify the LM own lane R based on the presence of the delimiting lines on both lateral sides of the camera own lane B and the camera adjacent lanes F, even if the types of the delimiting lines B1 of the camera own lane B match the types of the delimiting lines A1 of the plurality of LM lanes A. Accordingly, it is possible to more efficiently identify the LM own lane R.

Further, upon determining that the vehicle V has performed the lane change on the local map after identifying the LM own lane R, the position identifying unit 54 changes the LM own lane R according to the direction of the lane change. Accordingly, it is possible to appropriately change the LM own lane R according to the lane change.

Further, in a case where the type of the camera delimiting line can be identified and the lane number of the newly identified LM own lane R does not match the lane number of the previously identified LM own lane R, the position identifying unit 54 resets the lane number of the LM own lane R. Accordingly, it is possible to avoid keeping on incorrectly identifying the LM own lane R.

Further, upon ceasing to estimate the LM own vehicle position after identifying the LM own lane R, the position identifying unit 54 resets the lane number of the LM own lane R. Accordingly, it is possible to avoid keeping on incorrectly identifying the LM own lane R.

However, the position identifying unit 54 maintains the lane number of the LM own lane R as long as determining that the vehicle V does not deviate from the LM own lane R based on the DR movement amount of the vehicle V, even when ceasing to estimate the LM own vehicle position after identifying the one LM lane A, which is the only lane present in the specific area Y on the local map, as the LM own lane R. Accordingly, it is possible to more efficiently identify the LM own lane R by exceptionally maintaining the lane number of the LM own lane R when determining that the vehicle V does not deviate from the LM own lane R.

Concrete embodiments of the present invention have been described in the foregoing, but the present invention should not be limited by the foregoing embodiments and various modifications and alterations are possible within the scope of the present invention.

The invention claimed is:

1. A vehicle, comprising:
a camera configured to capture an image of a travel route on which the vehicle is traveling;
a map generating unit configured to generate a map of a surrounding area of the vehicle;
an own lane identifying unit configured to identify an own lane on which the vehicle is traveling on the map; and
a mode setting unit configured to switch a driving mode of the vehicle between a manual driving mode and an autonomous driving mode,
wherein the own lane identifying unit is configured to
estimate a position of the vehicle on the map,
calculate the number of lanes present in a specific area including the position of the vehicle on the map,
identify one lane as the own lane on the map in a case where the one lane is an only lane present in the specific area on the map,
compare a type of a delimiting line of a captured own lane with types of delimiting lines of a plurality of lanes on the map in a case where the plurality of lanes are present in the specific area on the map, the captured own lane being an own lane recognized from the image captured by the camera, and identify one of the plurality of lanes on the map as the own lane on the map in a case where the type of the delimiting line of the captured own lane matches only a type of a delimiting line of the one of the plurality of lanes on the map, wherein the own lane identifying unit is configured to update the own lane on the map according to a travel position of the vehicle when the vehicle is traveling autonomously in the autonomous driving mode, wherein upon determining that the vehicle has performed a lane change on the map after identifying the own lane on the map, the own lane identifying unit changes the own lane on the map according to a direction of the lane change, wherein in a case where the delimiting line is not present between a merging lane on the map and a main lane on the map at a place where the merging lane merges with the main lane, the own lane identifying unit sets a virtual delimiting line between the merging lane and the main lane such that a distance from the merging lane to the virtual delimiting line is equal to the distance from the main lane to the virtual delimiting line, and in a case where a center of the vehicle on the map crosses the virtual delimiting line and shifts from the virtual delimiting line by a prescribed length or more, the own lane identifying unit determines that the vehicle has performed the lane change on the map from the merging lane to the main lane across the virtual delimiting line.

2. The vehicle according to claim 1, wherein in a case where the type of the delimiting line of the captured own lane matches the types of the delimiting lines of the plurality of lanes on the map and a road shoulder is present on one lateral side of the captured own lane, the own lane identifying unit identifies an end lane as the own lane on the map, the end lane being arranged at an end on the one lateral side among the plurality of lanes on the map.

3. The vehicle according to claim 1, wherein in a case where the type of the delimiting line of the captured own lane matches the types of the delimiting lines of the plurality of lanes on the map, delimiting lines are present on both lateral sides of the captured own lane and both lateral sides of left and right adjacent lanes arranged on both lateral sides of the captured own lane, and three lanes are present in the specific area on the map, the own lane identifying unit identifies a center lane among the three lanes as the own lane on the map.

4. The vehicle according to claim 1, wherein in a case where a type of a delimiting line recognized from the image captured by the camera can be identified and a lane number of a newly identified own lane on the map does not match a lane number of a previously identified own lane on the map, the own lane identifying unit resets information on the own lane on the map.

5. The vehicle according to claim 1, wherein upon ceasing to estimate the position of the vehicle on the map after identifying the own lane on the map, the own lane identifying unit resets information on the own lane on the map.

6. The vehicle according to claim 5, further comprising a movement amount calculating unit configured to calculate a movement amount of the vehicle by using dead reckoning, wherein the own lane identifying unit maintains the information on the own lane on the map as long as determining that the vehicle does not deviate from the own lane on the map based on the movement amount of the vehicle calculated by the movement amount calculating unit, even when ceasing to estimate the position of the vehicle on the map after identifying the one lane, which is the only lane present in the specific area on the map, as the own lane on the map.

* * * * *